(12) United States Patent
Jacob et al.

(10) Patent No.: US 8,176,473 B2
(45) Date of Patent: May 8, 2012

(54) TRANSFORMATIONS FOR SOFTWARE OBFUSCATION AND INDIVIDUALIZATION

(75) Inventors: Matthias Jacob, Princeton, NJ (US); Mariusz H. Jakubowski, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1394 days.

(21) Appl. No.: 11/748,191

(22) Filed: May 14, 2007

(65) Prior Publication Data
US 2008/0288921 A1 Nov. 20, 2008

(51) Int. Cl.
*G06F 9/44* (2006.01)
*G06F 11/30* (2006.01)
*G06F 11/00* (2006.01)

(52) U.S. Cl. ........ 717/120; 717/126; 717/127; 717/141; 713/187; 713/189; 726/22; 726/23; 726/26

(58) Field of Classification Search .................... 717/136
See application file for complete search history.

(56) References Cited

U.S. PATENT DOCUMENTS

| | | | | |
|---|---|---|---|---|
| 5,974,255 | A * | 10/1999 | Gossain et al. | 717/124 |
| 7,287,166 | B1 * | 10/2007 | Chang et al. | 713/187 |
| 2005/0246554 | A1 * | 11/2005 | Batson | 713/194 |
| 2006/0005250 | A1 | 1/2006 | Chu et al. | |
| 2007/0039048 | A1 * | 2/2007 | Shelest et al. | 726/22 |
| 2007/0234070 | A1 * | 10/2007 | Horning et al. | 713/190 |
| 2008/0215860 | A1 * | 9/2008 | Jacob et al. | 712/226 |

FOREIGN PATENT DOCUMENTS

| | | |
|---|---|---|
| WO | WO0038034 A1 | 6/2000 |
| WO | WO2005019974 A2 | 3/2005 |

OTHER PUBLICATIONS

Hines et al., Using De-optimization to Re-optimize Code, Computer Science Dept., Florida State University & University of Virginia, Published Sep. 20, 2005, pp. 1-27.*
PCT Intl Search Report and Written Opinion for Application No. PCT/US2008/062778, dated Sep. 25, 2008, 10 pgs.
Aucsmith, "Tamper Resistant Software: An Implementation", Lecture Notes in Computer Science, vol. 1174, Proceedings of the 1st Intl Workshop on Information Hiding, 1996, 11 pages.
Chang et al, "Protecting Software Codes by Guards", Lecture Notes in Computer Science, vol. 2320, 2002, 15 pages.
Collberg et al, "Manufacturing Cheap, Resilient, and Stealthy Opaque Constructs", Annual Symposium on Principles of Programming Languages, Proceedings of 25th ACM SIGPLAN-SIGACT symposium, 1998, 13 pages.

(Continued)

*Primary Examiner* — Isaac Tecklu
(74) *Attorney, Agent, or Firm* — Lee & Hayes, PLLC

(57) ABSTRACT

Methods and systems for software obfuscation are disclosed. In one exemplary embodiment, the obfuscation includes integrating the checker code with product code to form integrated code. The product code includes a first portion that provides desired functionalities to a software product, while the checker code includes a second portion that protects the product code from unlicensed use. A generated pseudorandom value is used to select one or more instruction sequences of the integrated code. Following the selection, the instruction sequences may be replaced with equivalent instruction sequences to form a new integrated code. Alternatively, the original integrated code is transformed into new integrated code when the selected instruction sequences are optimized. Additionally, the new integrated code may be compared to the original integrated code by generating output states from each integrated code. The new integrated code is functionally equivalent to the original integrated code if the respective output states match.

17 Claims, 14 Drawing Sheets

OTHER PUBLICATIONS

Forrest et al, "Building Diverse Computer Systems", Proceedings of the 6th Workshop on Hot Topics in Operating Systems, IEEE Computer Society Press, 1997, 6 pages.

Massalin, "Superoptimizer—A Look at the Smallest Program", Architectual Support for Programming Languages and Operating Systems, IEEE Computer Society Press, 1987, pp. 122-126.

* cited by examiner

TRANSFORMATIONS FOR SOFTWARE OBFUSCATION AND INDIVIDUALIZATION

BACKGROUND

Intellectual property piracy, including software piracy, is a common problem for today's software industry. Intellectual property pirates may cause significant monetary damage by illegally copying movies, computer software, and other content protected by intellectual property laws.

The software industry has relied on so-called "checker software" embedded in software products to monitor unlawful copying activity, ensure authenticity, and maintain proper licensing of the software products. However, intellectual property pirates are increasingly targeting the embedded checker software. Checker software may often be distinguished from product software during reverse engineering. As a result, intellectual property pirates are increasingly turning to reverse engineering of software products to remove the embedded checker software.

Accordingly, there is an ongoing need to improve techniques for thwarting pirate efforts to reverse engineer code to ensure that intellectual properties, including computer software, have better protection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for obfuscating checker code are disclosed herein. In one exemplary embodiment, the obfuscation includes integrating the checker code with product code to form integrated code. The product code includes a first portion that provides desired functionalities to a software product, while the checker code includes a second portion that protects the product code from unlicensed use. A generated pseudorandom value is used to select one or more instruction sequences of the integrated code. Following the selection, the instruction sequences may be replaced with equivalent instruction sequences to form a new integrated code. Alternatively, the original integrated code is transformed into new integrated code when the selected instruction sequences are optimized.

In further embodiments, the new integrated code may be compared to the original integrated code. For instance, the original integrated code is executed to generate output states, and the new integrated code is executed to generate corresponding output states. If the respective output states match, the new integrated code is functionally equivalent to the original integrated code. The functionally equivalent new integrated code may then be saved for further use. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Systems and methods in accordance with the teachings of the present disclosure use pseudorandom selection and instruction sequence substitution, as well as pseudorandom selection and optimization, to obfuscate software. Through obfuscation, the distinction between the product software and the embedded checker software may be obscured without affecting the functionalities of each type of software. Pseudorandom selection and optimization may include transformation using peephole optimization techniques. Various examples of obfuscation using pseudorandom selection and instruction sequence substitution, as well as pseudorandom selection and optimization, are described below with reference to FIGS. 1-9.

Figure 1:
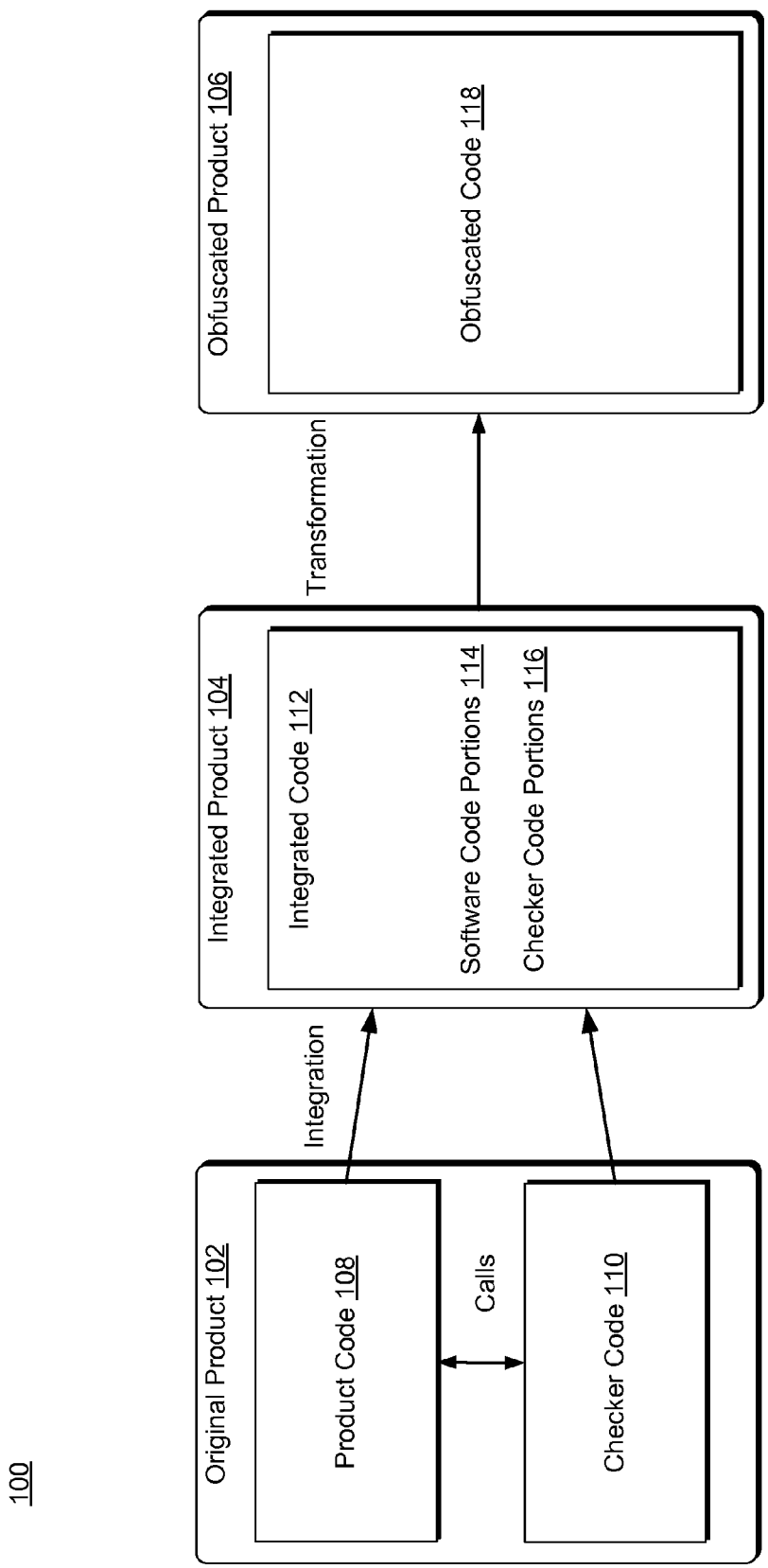
FIG. 1 is a block diagram of a software product at various stages of a process for obfuscating the software product.

FIG. 1 shows three stages of a software product during a process 100 to obfuscate the software. In this embodiment, the three stages include an original software product 102, an integrated product 104, and an obfuscated product 106. The original software product 102 includes a product code 108 and a checker code 110. The product code 108 includes the application software that is intended to be protected using obfuscation, and may include, for example, a word processing software program, a spreadsheet software program, a slide presentation software program, and the like. On the other hand, the checker code 110 includes software code that is designed to protect the product code 108 from unauthorized use, modification, copying, distribution, reverse engineering, and the like. For example, in some instances, the product code 108 may make command calls to activate checker code 110 to validate the integrity and/or authenticity of the product code 108 during operation.

The product code 108 and the checker code 110 may include many types of compiled and interpreter-based software codes. For example, the product code 108 and the checker code 110 may be in the form of a low-level intermediate representation (LIR) (e.g., bytecode, Boolean clauses, etc.). Additionally, the product code 108 and the checker code 110 may be in the form of machine code. Generally speaking, machine code refers to a system of instructions and data that are directly understandable by a computer's central processing unit (CPU). In some embodiments, for example, the machine code may include 80x86 instructions configured to run on processors manufactured by Intel Corporation. In various embodiments, machine code may be in binary form.

As illustrated in FIG. 1, an integrated product 104 with integrated code 112 may be produced by the original software product 102 via an integration process. The integrated code 112 includes one or more product code portions 114, as well as one or more checker code portions 116. As shown, the one or more product code portions 114 correlates with product code 108 of the original software product 102, and the one or more checker code portions 116 correlates with checker code 110 of the original software product 102.

In one implementation, the integration process may include separating the product code 108 and the checker code 110 into one or more portions, and inlining the portions, thus producing the integrated code 112 of integrated product 104. The integrated code 112 of the integrated product 104 may be further transformed into an obfuscated code 118. This transformation process results in an obfuscated software product 106.

The transformation of the original software product 102 into an obfuscated software product 106, in accordance with the process 100 generally illustrated in FIG. 1, may advantageously obfuscate the software code 108 and the checker code 110 so that the content of each code may not be readily discerned from the examination of the code instructions. In this way, the transformation may make reverse engineering and removal of an embedded checker from a software product impractical or unfeasible.

Exemplary System Architecture

Figure 2:
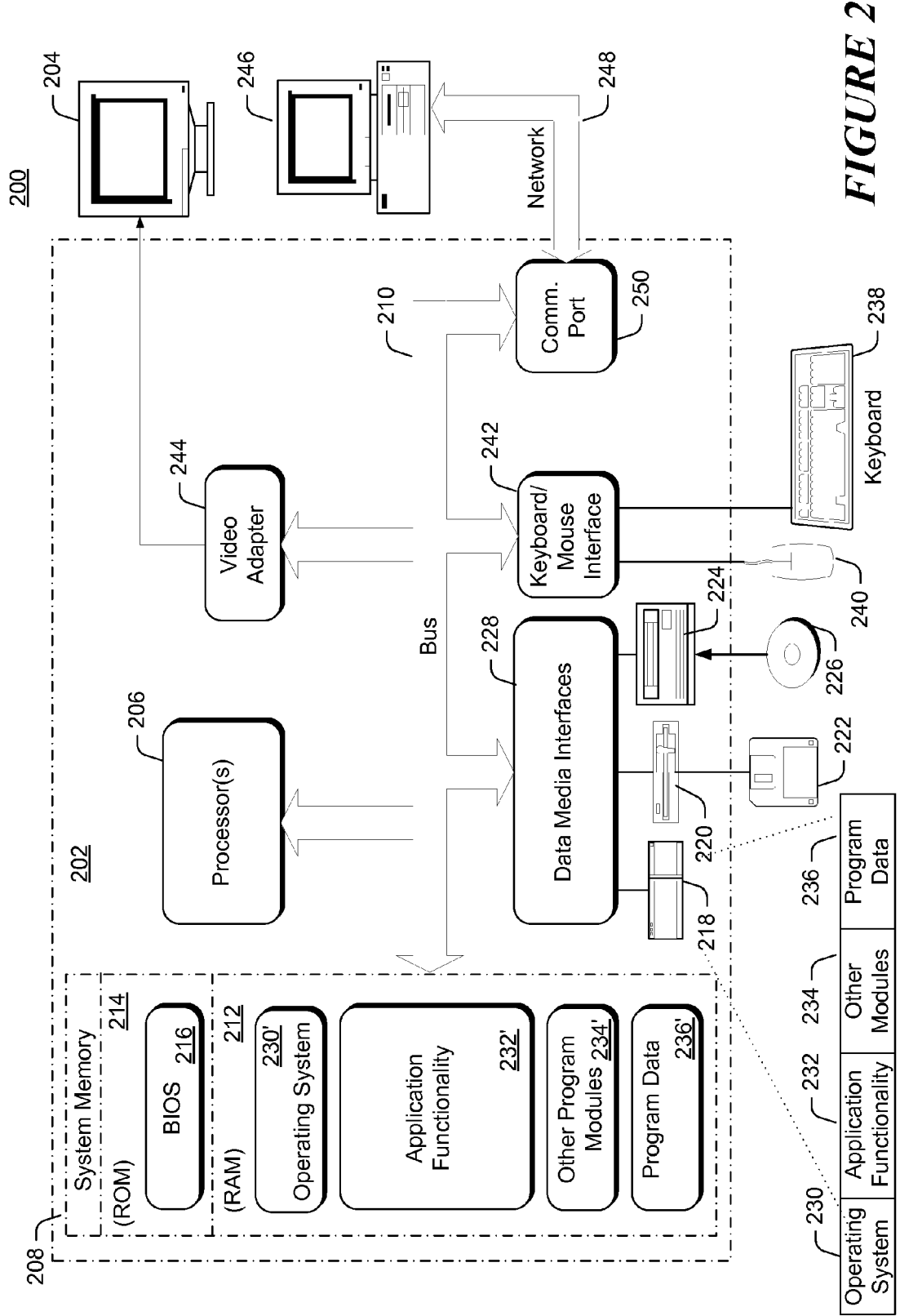
FIG. 2 is a block diagram illustrating a representative computing environment that may be used to implement the transformation techniques and mechanisms described herein.

FIG. 2 is a block diagram illustrating a representative computing environment 200 that may be used to implement the transformation techniques and mechanisms described herein. However, it will readily appreciate that the various embodiments of the transformation techniques may be implemented in different computing environments. The computing environment 200 shown in FIG. 2 is only one example of a computing environment and is not intended to suggest any limitation as to the scope of use or functionality of the computer and network architectures. Neither should the computing environment 200 be interpreted as having any dependency or requirement relating to any one or combination of components illustrated in the example computing environment.

As depicted in FIG. 2, the exemplary computing environment 200 may include a computing device 202 having one or more processors 206. A system memory 208 is coupled to the processor(s) 206 by one or more buses 210. The one or more buses 210 may be implemented using any kind of bus structure or combination of bus structures, including a memory bus or memory controller, a peripheral bus, an accelerated graphics port, and a processor or local bus using any of a variety of bus architectures. It is appreciated that the one or more buses 210 provide for the transmission of computer-readable instructions, data structures, program modules, and other data encoded in one or more modulated carrier waves. Accordingly, the one or more buses 210 may also be characterized as computer-readable mediums.

The system memory 208 may include both volatile and non-volatile memory, such as random access memory (RAM) 212, and read only memory (ROM) 214. The environment 200 also includes one or more mass storage devices, which may also be characterized as mass storage type input/output devices, may include a variety of types of volatile and non-volatile media, each of which can be removable or non-removable. For example, the mass storage devices may include a hard disk drive 218 for reading from and writing to a non-removable, non-volatile magnetic media, a magnetic disk drive 220 for reading from and writing to a removable, non-volatile magnetic disk 222 (e.g., a "floppy disk"), and an optical disk drive 224 for reading from and/or writing to a removable, non-volatile optical disk 226 such as a compact disk (CD), digital versatile disk (DVD), or other optical media. Although not shown, the one or more mass storage devices may also include other types of computer-readable medium, such as magnetic cassettes or other magnetic storage devices, flash memory cards, electrically erasable programmable read-only memory (EEPROM), or the like. The hard disk drive 218, magnetic disk drive 220, and optical disk drive 224 may each be connected to the system bus 210 by one or more data media interfaces 228. Alternatively, the hard disk drive 218, magnetic disk drive 220, and optical disk drive 224 may be coupled to the system bus 210 by a SCSI interface (not shown), or other coupling mechanism.

In addition to the mass storage type input/output devices described above, the environment 200 includes various input/output devices such as a display device 204, a keyboard 238, a pointing device 240 (e.g., a "mouse") and one or more communication ports 250. In further embodiments, the input/output devices may also include speakers, microphone, printer, joystick, game pad, satellite dish, scanner, card reading devices, digital or video camera, or the like. The input/output devices may be coupled to the system bus 210 through any kind of input/output interface 242 and bus structures, such as a parallel port, serial port, game port, universal serial bus (USB) port, video adapter 244 or the like.

The computing environment 200 may further include one or more additional computing devices 246 communicatively coupled by one or more networks 248. Accordingly, the computing device 202 may operate in a networked environment using logical connections to one or more remote computing devices 246. The remote computing device 246 can comprise any kind of computer equipment, including personal computers, server computers, hand-held or laptop devices, multiprocessor systems, microprocessor-base systems, set top boxes, game consoles, programmable consumer electronics, network PCs, minicomputers, and mainframe computers. The remote computing devices 246 may include all of the features discussed above with respect to computing device 202, or some subset thereof. The networked environment may further be utilized to implement a distributed computing environment. In a distributed computing environment, computing resources can be physically dispersed throughout the environment.

Any type of network 248 can be used to couple the computing device 202 with one or more remote computing devices 246, such as a wide-area network (WAN), a local area network (LAN), and/or the like. The computing device 202 may be coupled to the network 248 via a communication port 250, such as a network interface card. The communication port 250 may utilize broadband connectivity, modem connectivity, DSL connectivity, or other connection strategy. Although not illustrated, the computing environment 200 may also provide wireless communication functionality for connecting computing device 202 with remote computing devices 246 (e.g., via modulated radio signals, modulated infrared signals, etc.). It is appreciated that the one or more networks 248 provide for the transmission of computer-readable instructions, data structures, program modules, and other data encoded in one or more modulated carrier waves.

Generally, one or more of the above-identified computer-readable mediums provide storage of computer-readable instructions, data structures, program modules, and other data for use by the computing device 202. For instance, one or more of the computer-readable mediums may store the operating system 230, one or more application functionalities 232 (including functionality for implementing aspects of the software transformation methods), other program modules 234, and program data 236. More specifically, the ROM 214 typically includes a basic input/output system (BIOS) 216. BIOS 216 contains the basic routines that help to transfer information between elements within computing device 202, such as during start-up. The RAM 212 typically contains the operating system 230', one or more applications functionalities 232', other program modules 234' and program data 236', in a form that can be quickly accessed by the processor 206. The content in the RAM 212 is typically transferred to and from one or more of the mass storage devices (e.g., hard disk drive 218), for non-volatile storage thereof.

It is appreciated that the illustrated operating environment 200 is only one example of a suitable operating environment and is not intended to suggest any limitation as to the scope of use or functionality of the invention. Other well-known computing systems, environments and/or configurations that may be suitable for use with the invention include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Figure 3:
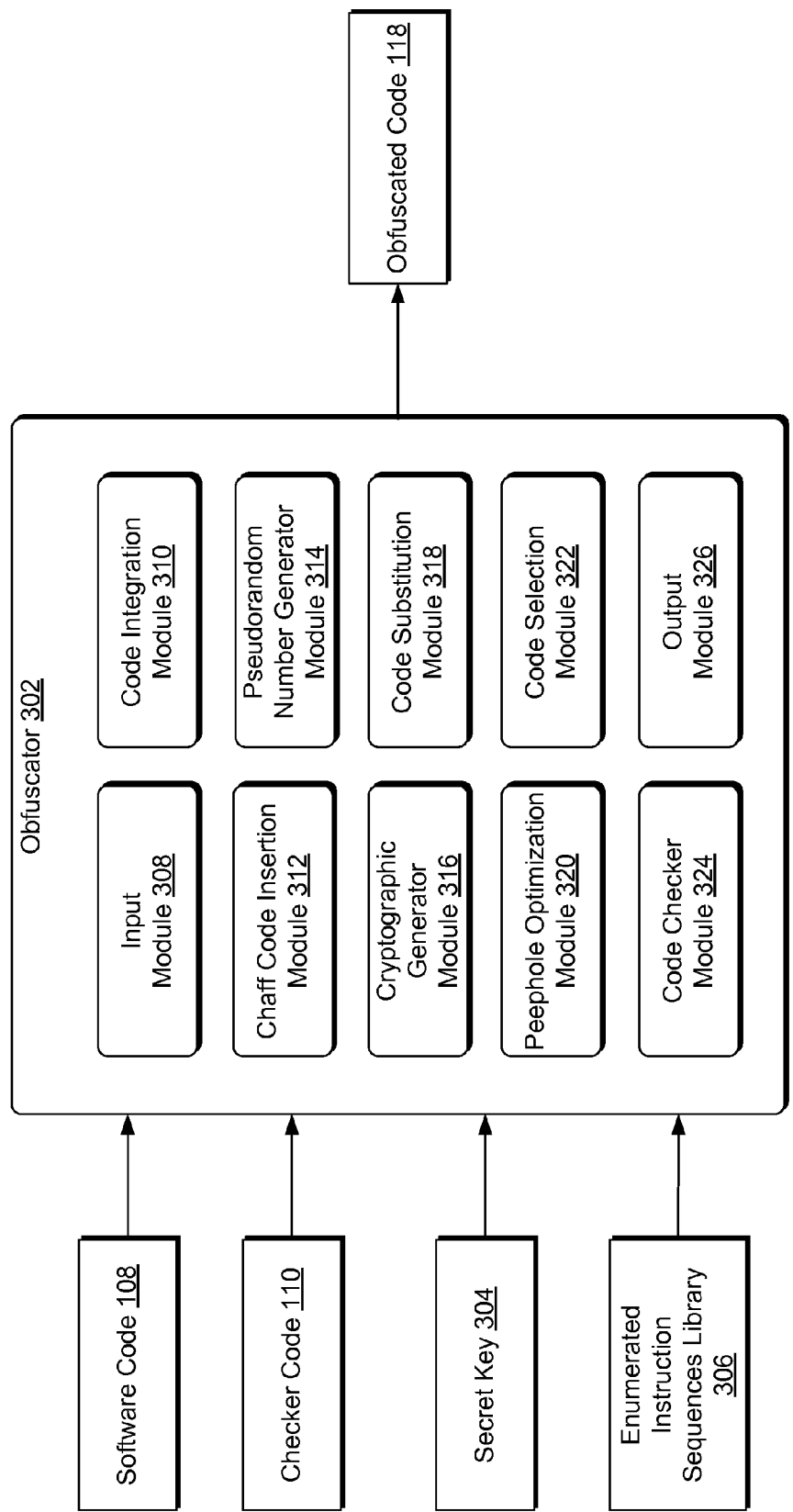
FIG. 3 is a block diagram illustrating selected modules of an obfuscator that may be implemented in the representative computing environment shown in FIG. 2.

FIG. 3 illustrates selected modules of an obfuscator 302 that may be implemented in the representative computing environment 200 shown in FIG. 2. In one implementation, the obfuscator 302 may be stored in a mass storage device, e.g., hard disk drive 218. The obfuscator 302 may include an input module 308, a code integration module 310, a chaff code insertion module 312, a pseudorandom number generator module 314, a cryptographic generator module 316, a code substitution module 318, a peephole optimization module 320, a code selection module 322, a code checker module 324, and an output module 326. These modules may be implemented as software or computer-executable instructions that are executed by the one or more processors 206. The operating system 230', in response to a command, may cause the obfuscator 302 to be loaded from a mass storage device, e.g., hard disk drive 218, into system memory 208. The operating system 230' may then cause the one or more processors 206 to execute the one or more modules of the obfuscator 302.

The input module 308 may be employed to load data into the system memory 208. The data may be of any form, such as software code, numerical values, and the like. The data may be loaded from a mass storage device such as a hard disk drive 118, a magnetic disk drive 120, or an optical disk drive 224. In addition, the input module 308 may also load data from the network 248. In one implementation, the input module 308 may be configured to load data such as the software code 108, the checker code 110 (as described in FIG. 1), a secret key 304, and instruction sequences from an enumerated instruction sequences library 306. The software code 108 and the checker code 110 may be source code, LIR code, machine code, and the like.

The enumerated instruction sequences library 306 typically includes a large quantity of generated instruction sequences. The instruction sequences may be generated based on certain criteria. For instance, all possible instruction sequences up to a given length (e.g. length of 10 instructions) may be generated. In another example, all possible instruction sequences including a certain operation, e.g., multiplication, may be generated. However, it will be appreciated that the enumerated instruction sequence library 306 may include instruction sequences generated based on one or more other criteria. Moreover, in some embodiments, the enumerated instruction sequences library 306 may be generated by a module (not shown) included in the obfuscator 302.

The code integration module 310 may be configured to integrate the product code 108 and the checker code 110, as received via the input module 308. As described above, the product code 108 may include application software that provides the desired functions and that is desired to be protected from piracy. On the other hand, the checker code 110 may include code that helps to protect the product code 108 from unlicensed use. In some embodiments, the code integration module 310 may separate each code into portions, then inline, that is, integrate, the portions of the software code 108 with portions of the checker code 110 to produce an integrated code 112, as described in FIG. 1.

The chaff code insertion module 312 may be used to provide chaff code sequences into the integrated code 112. In some embodiments, chaff code sequences may include instructions that are executed with the integrated code 112, but which produce results that are not used by the integrated code 112. For example, a chaff code sequence may carry out a multiplication operation on two values, but result is discarded rather than used for further computation by the integrated code 112. In other embodiments, chaff code sequences may include instructions that initially modifies the results produced by the integrated code 112, but then reverses the modification. For example, a chaff code sequences may be combined with the integrated code 112 such that the chaff code initially adds a value to a result produced by the integrated code 112 to produce a modified result. However, after further execution of the integrated code 112 using the modified result, another complementary chaff code sequence may subtract the same value from the modified result. From these illustrative examples, it will be appreciated that chaff codes may be any executable code sequence that is capable of being combined with the integrated code 112, but which do not affect the ultimate result generated by the integrated code 112.

The pseudorandom number generator module 314 may be configured to generate pseudorandom numbers. In some implementations, a generated pseudorandom number may be used to seed a cryptographic generator module 316. In turn, the cryptographic generator module 316 may generate a numerical sequence based on the pseudorandom number. In additional embodiments, the pseudorandom number generator module 314 may be further configured to generate a pseudorandom number based on the secret key 304. In one implementation, the secret key 304 may be a numerical value. However, it will be appreciated that in other implementations, the secret key 304 may be an alphanumerical string, a binary number, or any other data that represents a value. The use of the secret key 304 may enable a user to control the pseudorandom numbers generated by the pseudorandom number generator module 314.

With continued reference to FIG. 3, the code substitution module 318 may be used to transform the integrated code 112. Specifically, the code substitution module 318 may replace one or more instruction sequences of the integrated code 112 with equivalent instruction sequences from enumerated instruction sequence library 306. This technique may be referred to as "superobfuscation."

According to various embodiments, the code substitution module 318 may be configured to first activate the pseudorandom number generator module 314 to generate numerical values. In turn, the code substitution module 318 may be configured to use the generated numerical values to select instruction sequences from portions 114 and 116 of the integrated code 112. In one embodiment, the selected instruction sequences may include instruction sequences that perform functions.

Once a particular instruction sequence is selected, the code substitution module 318 may search for an equivalent sequence from the enumerated instruction sequence library 306. In certain implementations, the code substitution module 318 may access the enumerated instruction sequences library 306 via the input module 308.

The code substitution module 318 may search for an equivalent instruction sequence in various ways. In one implementation, the code substitution module 318 may search for the equivalent instruction sequence exhaustively. In other words, the code substitution module 318 may continuously test each enumerated instruction sequence included in the library 306 until an equivalent instruction sequence is found.

Alternatively, in another implementation, the code substitution module 318 may pseudo-randomly select an instruction sequence from the enumerated instruction sequences library 306. For instance, the code substitution module 318 may activate the pseudorandom number generator module 314 and cryptographic generator module 316, and use the generated numerical sequence to select one or more instruction sequences from the enumerated instruction sequences library 306. The code substitution module 318 may then compare each instruction sequence selected from the library 306 with the selected instruction sequence from the integrated code 112 until a matching sequence is found.

In additional implementations, the code substitution module 318 may employ other techniques to select instruction sequences from the enumerated instruction sequences library 306. In one implementation, the code substitution module 318 may be configured to specifically select for instruction sequences from library 306 that carry out certain functions or contain specific instruction operands. Conversely, in another implementation, the code substitution module 318 may be configured to exclude certain instruction sequences of the library 306 from selection if these instructions carry out certain functions or contain specific instruction operands.

For example, the code substitution module 318 may be configured to only select for instruction sequences that carry out the multiplication function, or alternatively, exclude all instruction sequences that carry out the multiplication function. Once again, the code substitution module 318 may compare each instruction sequence selected from the library 306 with the selected instruction sequence from the integrated code 112 until a matching sequence is found.

In another implementation, the code substitution module 318 may employ the pseudorandom number generator module 314 and the cryptographic generator module 316 to generate a numerical sequence. In turn, the code substitution module 318 may be configured to use the generated numerical sequence as an index to sort or rearrange the instruction sequences in the enumerated instruction sequences library 306. In this way, when a search, such as a pseudorandom search or an exhaustive search, is performed by the code substitution module 318, the order which different instruction sequences is selected for comparison to the selected instruction sequence of the integrated code 112 may be varied. As describe above, the code substitution module 318 may perform comparisons until a matching sequence is found.

In an additional implementation, the code substitution module 318 may be further configured to carry out probabilistically-controlled selection of instruction sequences from the enumerated instruction sequences library 306. For instance, the code substitution module 318 may be configured to preferentially select a first operand function (e.g., multiplication) over a second operand function (e.g., addition). For example, the code substitution module 318 may select an instruction sequence that includes the first operand function (e.g., multiplication) every time the instruction is encountered. In contrast, the code substitution module 318 may only select an instruction sequence that includes the second operand function (e.g., addition) when it is encountered for the 5th time. In this way, the code substitution module 318 may be configured to probabilistically, that is, preferentially select certain type of instruction sequences from library 306 for equivalence comparison with the selected instruction sequence of integrated code 112.

It will be appreciated that the code substitution module 318 may interact with the code checker module 324, described below, to carry out the equivalence comparison of an instruction sequence selected from library 306 with a selected instruction sequence of integrated code 112. Accordingly, equivalence comparisons for finding functionally equivalent sequences, as mentioned above, are described with respect to the code checker module 324 in FIG. 4 below.

Returning to FIG. 3, in some embodiments, the code substitution module 318 may be configured to iterate the selection and replacement of instruction sequences in integrated code 112. In other words, the code substitution module 318 may repeat the generation of numerical sequences, and the selection and replacement of instruction sequence in integrated code 112, until the desired quantity of instruction sequences is substituted with equivalent instruction sequences.

Once the desired quantity of instruction sequences are substituted, the code substitution module 318 may be further configured to save the transformed integrated code 112 as an obfuscated code, such as obfuscated code 118.

The peephole optimization module 320 may be configured to activate the pseudorandom number generator module 314 and the cryptographic generator module 316 to generate numerical sequences. In turn, the peephole optimization module 320 may be configured to use a generated numerical sequence as an index to select one or more instruction sequences from portions of the integrated code 112 for optimization. The portions may include product code portions 114 and checker code portions 116.

Generally speaking, optimization operates on the principle that some software instructions in a software program may be replaced by other software instructions without affecting the functionally of the program. In some cases, these replacement instructions may enable the overall program to be "optimized," that is, the program may execute faster. In other cases, the size of the program may be reduced, or "optimized".

For instance, in a case where a software program includes x86 instructions, optimization may use a database of replacement patterns of x86 instructions that are semantically equivalent to replace or shorten the x86 instructions. In a specific example, the optimization may replace a "SLL ECX, 2" instruction with a "MUL ECX, 4" instruction. Moreover, optimization may shorten an x86 instruction by replacing a sequence of two or more instructions by a shorter instruction sequence. For example, the instruction sequence

JNC X
MOV EAX, [ESP]
X: RET may be replaced by the instruction sequence

CMOVC EAX, [ESP].

However, it will be appreciated that optimization techniques exist for other types of software instructions. For example, Java bytecode, which is a type of low-level intermediate representation (LIR), may be optimized by some Java compilers. Thus, in some embodiments, the peephole optimization module 320 may optimize an integrated code 112 that is in the form of a LIR such as a bytecode, Boolean clauses, and the like. In these embodiments, the peephole optimization module 320 may be configured to pseudo-randomly select code fragments and optimize these fragments. In some implementations, standard techniques such as Boolean simplification and transformation may be used to find equivalent code fragments and streamline the optimization process.

Accordingly, the peephole optimization module 320 may be configured to apply optimization techniques to pseudo-randomly selected portions of many different types of integrated code 112. The application of peephole optimization techniques to portions of the integrated code 112 may result in its transformation into an obfuscated code 118.

The code selection module 322 of FIG. 3 may enable a user to select one or more portions of the integrated code 112 for instruction substitution or optimization. In one implementation, the code selection module 322 may be configured to interact with a user via display device 204 and hardware associated with input/output interface 242. In some embodiments, the code selection module 322 may be configured to cause the display device 104 to display a visual representation of the integrated code 112. In these embodiments, the code selection module 332 may also be configured to receive the selections of one or more instruction sequences from the user via input/output interface 242. In one implementation, the user may select one or more checker code portions 116 of the integrated code 112 for optimization or substitution. Since the checker code portions 116 are generally essential to the protection of integrated code 112, the purposeful selection of one or more checker code portions 116 may serve to ensure that the portions are obfuscated via optimization or substitution.

In another implementation, the code selection module 322 may enable the user to select one or more specific instructions of the integrated code 112. In one particular exemplary scenario, if the user has knowledge that multiplication instructions are essential to the functionality of the integrated code 112, the user may interact with code selection module 322 to ensure that the multiplication instructions, or portions containing multiplication instruction, are selected for instruction sequence substitution by the code substitution module 318. In this way, the user may use the code selection module 322 to increase the probability that the code substitution module 318 may generate an obfuscated code 118 that is functionally equivalent to the integrated code 112.

The code checker module 324 (FIG. 3) may be provided to ensure that an obfuscated code, such as obfuscated code 310, is equivalent to the original integrated code 112. An embodiment of the code checker module 324 is illustrated in FIG. 4.

Figure 4:
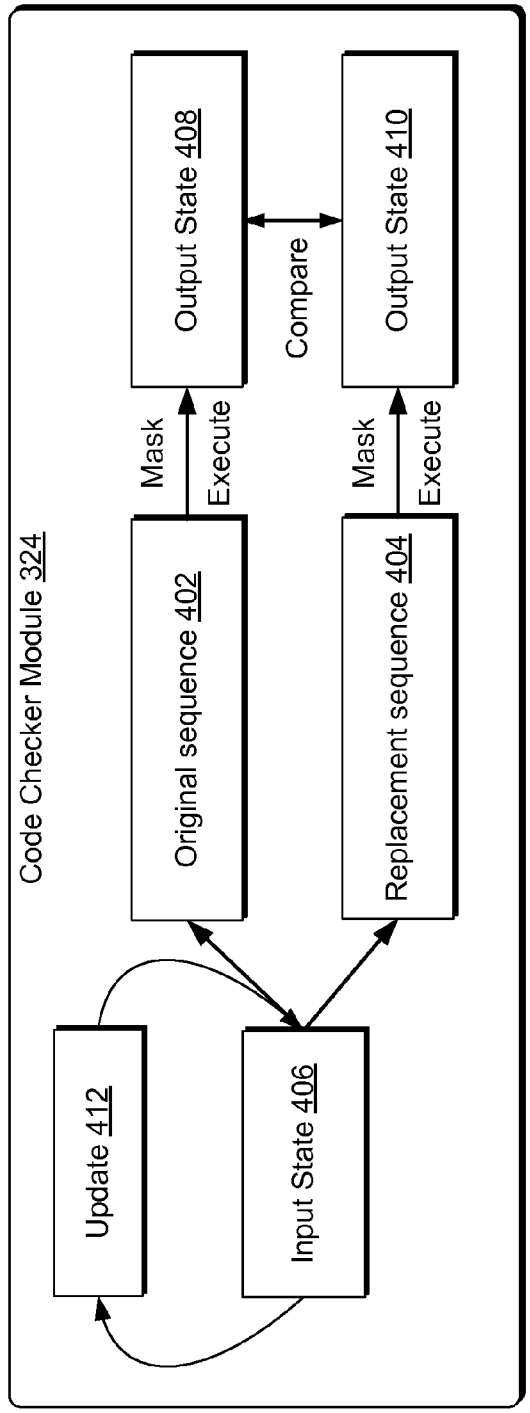
FIG. 4 is a block diagram illustrating an embodiment of an exemplary code checker module, as present in an obfuscator implemented in the representative computing environment shown in FIG. 2.

FIG. 4 shows an exemplary embodiment of the code checker module 324 in more detail, as present in an obfuscator 302 implemented in the representative computing environment 200 shown in FIG. 2. As shown in FIG. 4, the code checker module 324 may execute an original instruction sequence 402. Similarly, the code checker module 324 may also execute a replacement instruction sequence 404.

As shown in FIG. 4, the code checker module 324 may provide an input state 406 into the original instruction sequence 402 and the replacement instruction sequence 404 during the validation process. The code checker module 324 may then execute the original instruction sequence 402 and the replacement instruction sequence 404 using the input state 406. Subsequently, the code checker module 324 may compare an output state 408 of the original instruction sequence 402 with an output state 410 of the replacement instruction sequence 404. If the output state 408 and the output state 410 are equivalent, then the original instruction sequence 402 and the replacement instruction sequence 404 may be functionally equivalent.

In additional implementations, the code checker module 324 may repeat the equivalence testing process for additional input states. This may be achieved by using an update process 412 to update the input state 406 for each additional test. The update process 412 may be repeated until a desired number of iterations have been reached. Accordingly, the code checker module 324 may determine that the original instruction sequence 402 is functionally equivalent to the replacement instruction sequence 404 only if all the output states match.

In one embodiment, the original instruction sequence 402 may be an instruction sequence selected from the integrated code 112, and the replacement instruction sequence 404 may be an instruction sequence selected from the enumerated instruction sequences library 306. After execution, the code checker module 324 may compare and determine whether the after execution state 408 and 410 of the original instruction sequence 402 and the replacement instruction sequence 404, respectively, are equivalent. If the after execution state 408 and 410 are equivalent, then the selected sequences from the respective sources are functionally equivalent. Moreover, the code checker module 324 may repeat this equivalence checking procedure for a plurality of instruction sequences selected from the integrated code 112 and a plurality of instruction sequences selected from enumerated instruction sequences library 306.

In another embodiment, the original instruction sequence 402 may be an original instruction sequence from the integrated code 112, and the replacement instruction sequence 404 may be an obfuscated instruction sequence from the obfuscated code 118. The functional equivalence of the two types of instruction sequences is verified by the code checker module 324.

During this functional equivalence validation, the code checker module 324 may mask out certain state configurations of the obfuscated code 118 and the integrated code 112. The masked-out state configuration may include state configurations that are not important in the given context of the code. For example, if a "carry" flag is never used in the code context, an addition with "carry" may be equivalent to a normal "addition" operation. In other embodiments, the code checker module 324 may perform other masking operations, such as limiting the range of values in a register, ignoring other machine flags or registers, or restricting the addressing mode of the codes, and the like. The code checker module 324 may mask out certain state configurations of the obfuscated code 118 and the integrated code 112 to reduce the computation and processing efforts required to validate the functional equivalence of the codes. It will be appreciated that the code checker module 324 may mask other state configurations, so long as processing reduction may be achieved without comprising equivalence validation.

Moreover, the code checker module 324 may repeat the equivalence checking procedure for additional sequences of obfuscated code 118, as well as their analogous counterparts in the integrated code 112. Once all the obfuscated sequences in the obfuscated code 118 have been determined to be functionally equivalent to their analogous counterparts in the integrated code 112, the code checker module 324 may determine that the obfuscated code 118 is functionally equivalent to the integrated code 112. In some implementations, the code checker module 324 may include a machine simulator or a virtual machine to implement the testing of codes, such as integrated code 112 and obfuscated code 118, with respect to different input states.

Referring again to FIG. 3, the output module 326 may be configured to provide output data, from the obfuscator 302 to another location. The output data may include obfuscated code 118. Once outputted, the obfuscated code 118 may be further duplicated, distributed and executed. In some embodiments, the output module 326 may provide the obfuscated product 118 to a mass storage device such as the hard disk drive 218 (FIG. 2), the magnetic disk drive 220, or the optical disk drive 224. In addition, the output module 312 may also provide data, such as the obfuscated code 118, to additional destinations via network 248. Thereafter, an obfuscated product 106 that includes obfuscated code 118 may be further disseminated.

Figure 5:
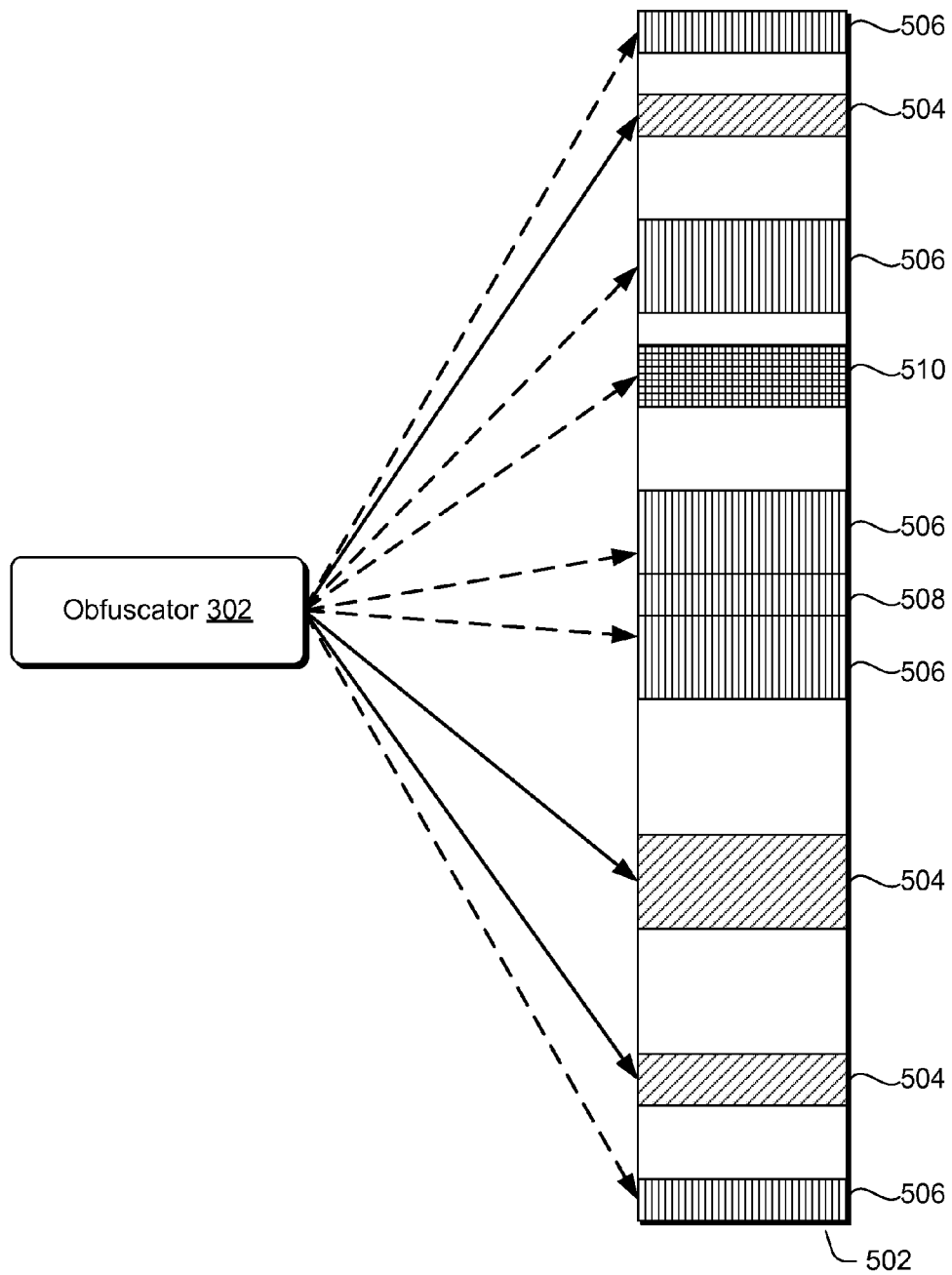
FIG. 5 is a block diagram illustrating a transformation selection process on a block of memory that contains a software code, as implemented on computing environment shown in FIG. 2.

FIG. 5 illustrates an obfuscation selection process 500 on a block of memory 502 that contains integrated code 112, as implemented on computing environment 200. As described above, the integrated code 112 may contain checker code portions, product code portions, and chaff code portions. As shown in FIG. 5, the obfuscator 302 may select one or more first instruction sequences 504. The first instruction sequences 504 may be parts of one or more checker code portions 116. The obfuscator 302 may select one or more instruction sequences 504 pseudo-randomly, or a user may use the code selection module 322 to purposefully guide the obfuscator 302 to select the one or more specific first instruction sequences 504.

Moreover, the obfuscator 302 may also select one or more second instruction sequences 506. The second instruction sequences 506 may be parts of one or more product code portions 114. Likewise, the obfuscator 302 may select one or more second instruction sequences 506 pseudo-randomly, or a user may use the code selection module 322 to purposefully guide the obfuscator 302 to select the one or more specific second instruction sequences 506. In further embodiments, the obfuscator 302 may select one or more instruction sequences that overlap. For example, as shown in FIG. 5, the obfuscator 302 has selected a plurality of second instruction sequences 506 that overlap, resulting in an overlapping region 508. Similarly, the obfuscator 302 may also select one or more third instruction sequences 510 of the one or more chaff code portions, either directed by a user or pseudo-randomly. Once the obfuscator 302 has selected instructions sequences 504, 506, and 510, it may perform obfuscation on the instructions as describe above.

Exemplary Processes

FIGS. 6-10 illustrate exemplary processes of various portions of the obfuscation process 100 shown in FIG. 1. The exemplary processes in FIGS. 6-10 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to computing environment 200 of FIG. 2, although they may be implemented in other system architectures.

Figure 6A:
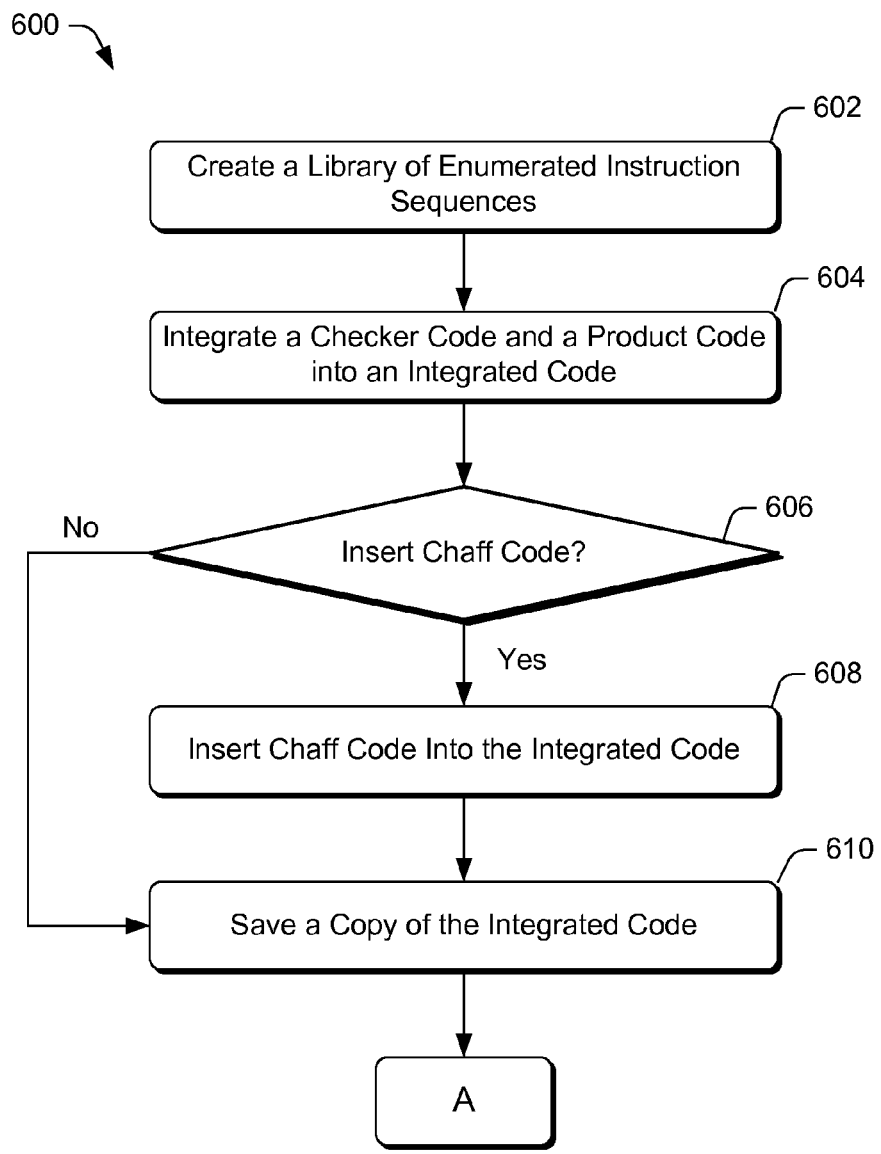
FIG. 6 is a flow diagram illustrating an exemplary process for the transformation of an original software product into an obfuscated software product via exhaustive instruction sequence search and substitution.

FIG. 6 is a flow diagram illustrating an exemplary process 600 for the transformation of an original software product 102 into an obfuscated software product 106 via exhaustive instruction sequence search and substitution. At block 602, a library of enumerated instruction sequences, such as library 306, may be created. As described above, the library may include a large quantity of generated instruction sequences, (e.g., all possible instruction sequences up to a certain length or meeting certain criteria). In one embodiment, the enumerated instruction sequences library may be generated by a module (not shown) in the obfuscator 302.

At block 604, the obfuscator 302 uses the code integration module 304 to integrate the software code 108 and checker code 110, producing integrated code 112. At decision block 606, a user may make a decision as to whether integrated code 112 should be provided with chaff code. If the user determines that chaff code should not be inserted into the integrated code 112, ("no" at decision block 606), the process may proceed directly to block 610.

However, if the user determines that chaff code should be inserted into integrated code 112, the obfuscator 302 may use the chaff code insertion module 304 at block 608 to provide one or more chaff codes into the integrated code 112. At block 610, the obfuscator 302 may save a copy of the integrated code 112 to at least one of system memory 108 and one of the mass media storage devices, such as hard disk drive 218.

At block 612, the user may use the code selection module 322 to select an instruction sequence of the integrated code 112 for obfuscation. For example, the user may select an instruction sequence of checker code portions 116 because of its importance, or the user may select an instruction sequence of the product code portions 114 because it performs certain function. Alternatively, at block 614, the obfuscator 302 may use the code substitution module 318, in conjunction with the pseudorandom generator number module 314, to pseudo-randomly select an instruction sequence from the integrated code 112. The selected instruction sequence is referred to as the "selected sequence."

At block 616, the code substitution module 318 may obtain an instruction sequence from the enumerated instruction sequences library 306. This obtained instruction sequence is referred to as the "enumerated sequence." In one implementation, the "enumerated sequence" may be obtained via the input module 308. At block 618, the obfuscator 302 may use the code checker module 324 to determine whether the newly obtained "enumerated sequence" is equivalent to the "selected sequence".

At decision block 620, if the code checker module 324 determines that the newly obtained "enumerated sequence" is not functionally equivalent to the "selected sequence," ("no" at decision block 620), the process 600 may loop back to block 616. At block 616, the code substitution module 318 may select another new "enumerated sequence" from the enumerated instruction sequences library 306 for equivalency comparison with the "selected sequence." In this way, blocks 616 and 618, as well as decision block 620, may be looped to exhaustively search and compare each "enumerated sequence" in the library 306.

However, if the code checker module 324 determines that a newly obtained "enumerated sequence" is functionally equivalent to the "selected sequence", ("yes" at decision block 620), the process 600 may proceed to block 622. At block 622, the "selected sequence" of the integrated code 112 may be replaced by the functionally equivalent "enumerated sequence" to produce obfuscated integrated code 112. At block 624, the obfuscated integrated code 112 is saved to a mass storage device, such as a hard disk drive 218, a magnetic disk drive 220, or an optical disk 226.

At decision block 626, the code substitution module 318 may determine if the process in blocks 612-624 should be iterated. For example, the obfuscator 302 may repeat the process if the user has configured the code substitution module 318 to go through a plurality of iterations. In such an implementation, if the code substitution module 318 determines that iteration should occur ("yes" at decision block 626), the process will loop back to step 612, where blocks 612-624 are re-executed on the obfuscated code previously saved at block 624.

However, if the code substitution module 318 determines that iteration should not occur, ("no" at decision block 626), then the process will proceed to block 628. At block 628, the obfuscated code, which may be obfuscated code 118, is provided by the output module 326 of the obfuscator 302 for execution.

Figure 7A:
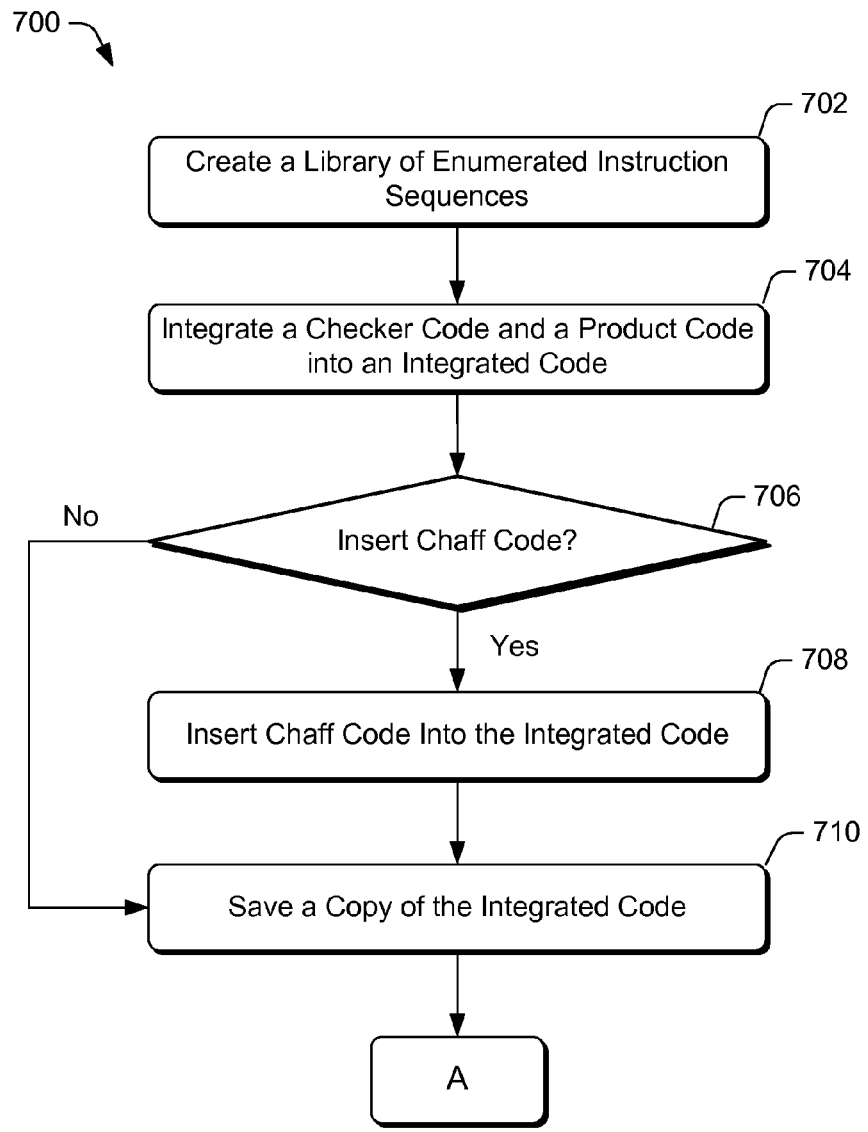
FIG. 7 is a flow diagram illustrating an exemplary process for the transformation of an original software product into an obfuscated software product via selective instruction sequence search and substitution.
Figure 7B:
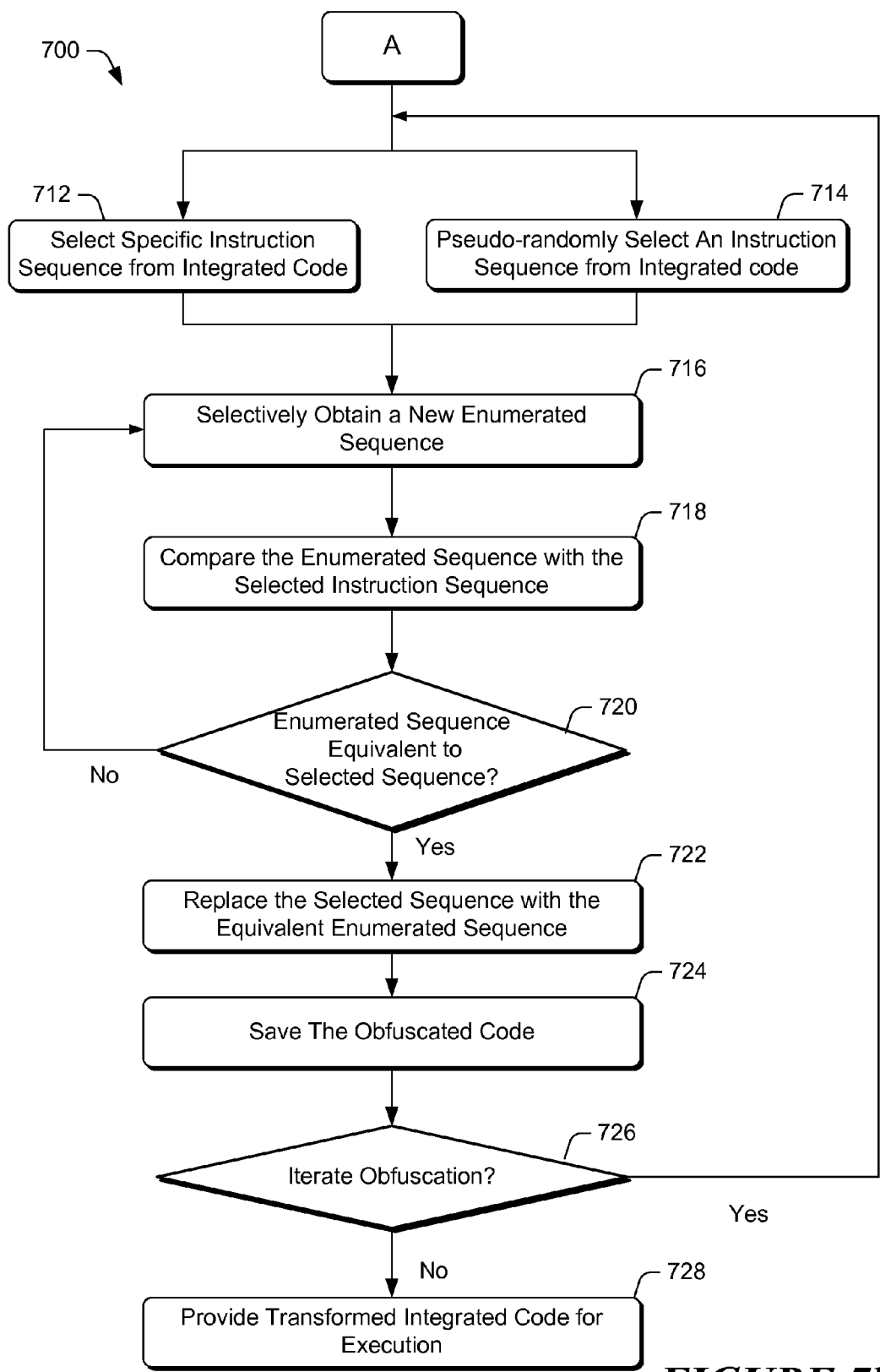

FIG. 7 is a flow diagram illustrating an exemplary process 700 for the transformation of an original software product 102 into an obfuscated software product 106 via selective instruction sequence search and substitution. At block 702, a library of enumerated instruction sequences, such as library 306, may be created. As described above, the library 306 may include a large quantity of generated instruction sequences, (e.g., all possible instruction sequences up to a certain length or meeting certain criteria). In one embodiment, the enumerated instruction sequences library may be generated by a module (not shown) in the obfuscator 302.

At block 704, the obfuscator 302 uses the code integration module 304 to integrate the software code 108 and checker code 110, producing integrated code 112. At decision block 706, a user may make a decision as to whether integrated code 112 should be provided with chaff code. If the user determines that chaff code should not be inserted into the integrated code 112, ("no" at decision block 706), the process may proceed directly to block 710.

However, if the user determines that chaff code should be inserted into integrated code 112, the obfuscator 302 may use the chaff code insertion module 304 at block 708 to provide one or more chaff codes into the integrated code 112. At block 710, the obfuscator 302 may save a copy of the integrated code 112 to at least one of system memory 108 and one of the mass media storage devices, such as hard disk drive 218.

At block 712, the user may use the code selection module 322 to select an instruction sequence of the integrated code 112 for obfuscation. For example, the user may select an instruction sequence of checker code portions 116 because of its importance, or the user may select an instruction sequence of the product code portions 114 because it performs certain function. Alternatively, at block 714, the obfuscator 302 may use the code substitution module 318, in conjunction with the pseudorandom generator number module 314, to pseudo-randomly select an instruction sequence from the integrated code 112. The selected instruction sequence is referred to as the "selected sequence."

At block 716, the obfuscator 302 may use the code substitution module 318 to selectively obtain an instruction sequence from the enumerated instruction sequences library 306. This obtained instruction sequence is referred to as the "enumerated sequence." In one implementation, the instruction sequence may be obtained via the input module 308.

In one implementation, the code substitution module 318 may pseudo-randomly obtain an instruction from the library 306 for equivalence comparison with the "selected sequence." In another implementation, the code substitution module 318 may selectively obtain an instruction sequence of a certain type by only including or excluding specific types of instruction sequences, e.g. including only multiplication instruction sequences or specifically excluding multiplication instruction sequences. In other implementations, the code substitute module 318 may selective obtain certain type of instruction sequences by changing the order of the instruction sequences in the library 306, or probabilistically pick certain type of instruction sequences over other types.

At block 718, the obfuscator 302 may use the code checker module 324 to determine whether the newly obtained "enumerated sequence" is equivalent to the "selected sequence". At decision block 720, if the code checker module 324 determines that the newly obtained "enumerated sequence" is not functionally equivalent to the "selected sequence," ("no" at decision block 720), the process 700 may loop back to block 716. At block 716, the code substitution module 318 may select another new "enumerated sequence" from the enumerated instruction sequences library 306. The new "enumerated sequence" is then compared for equivalency with the "selected sequence." In this way, blocks 716 and 718 and decision block 720 may be looped to selectively search for and obtain "enumerated sequences" from the library 306.

However, if the code checker module 324 determines that a newly obtained "enumerated sequence" is functionally equivalent to the "selected sequence", ("yes" at decision block 720), the process 700 may proceed to block 722. At block 722, the "selected sequence" of the integrated code 112 may be replaced with the functionally equivalent "enumerated sequence" to produce obfuscated integrated code 112. At block 724, the obfuscated integrated code 112 is saved to a mass storage device, such as a hard disk drive 218, a magnetic disk drive 220, or an optical disk 226.

At decision block 726, the code substitution module 318 may determine if the process in blocks 712-724 should be iterated. For example, the obfuscator 302 may repeat the process if the user has configured to code substitution module 318 to go through a plurality of iterations. In such an implementation, if the code substitution module 318 determines that iteration should occur ("yes" at decision block 726), the process will loop back to step 712, where blocks 712-724 are re-executed on the obfuscated code previously saved at block 726.

However, if the code substitution module 318 determines that iteration should not occur, ("no" at decision block 726), then the process will proceed to block 728. At block 728, the obfuscated code, which may be obfuscated code 118, is provided by the output module 326 of the obfuscator 302 for execution.

Figure 8A:
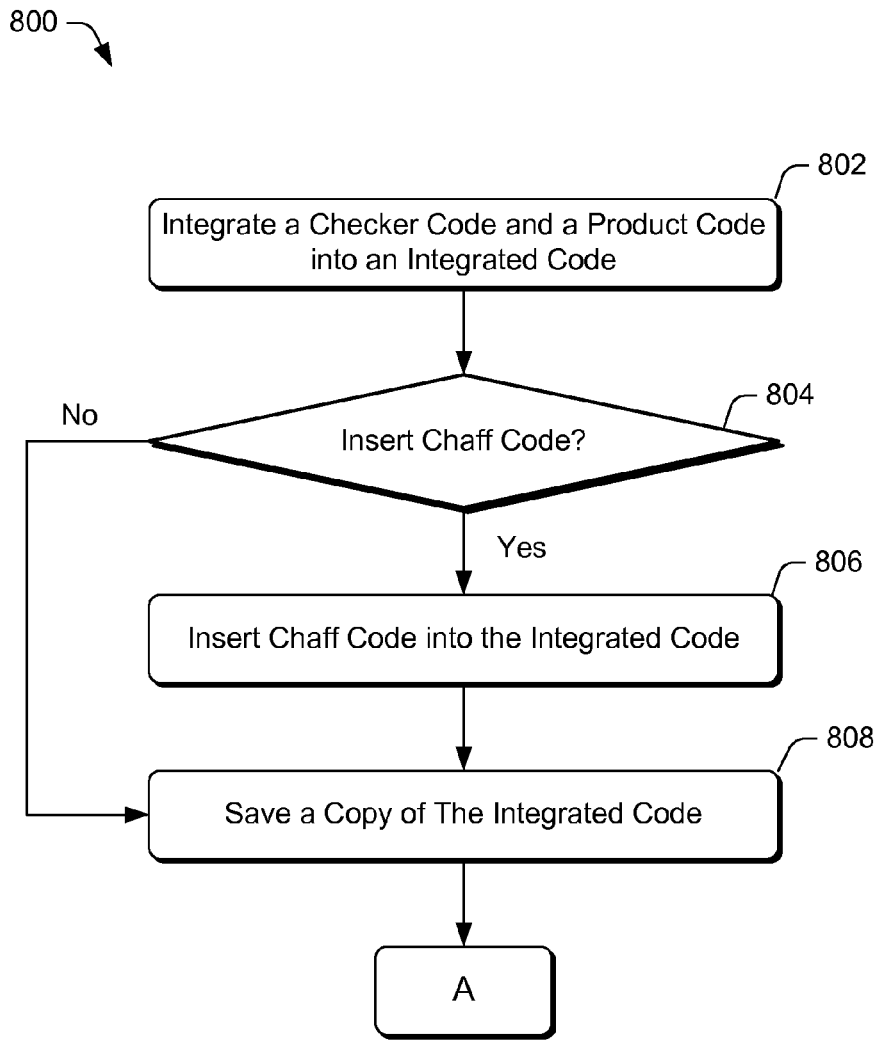
FIG. 8 is a flow diagram illustrating an exemplary process for the transformation of an original software product into an obfuscated software product via pseudorandom peephole optimization.
Figure 8B:
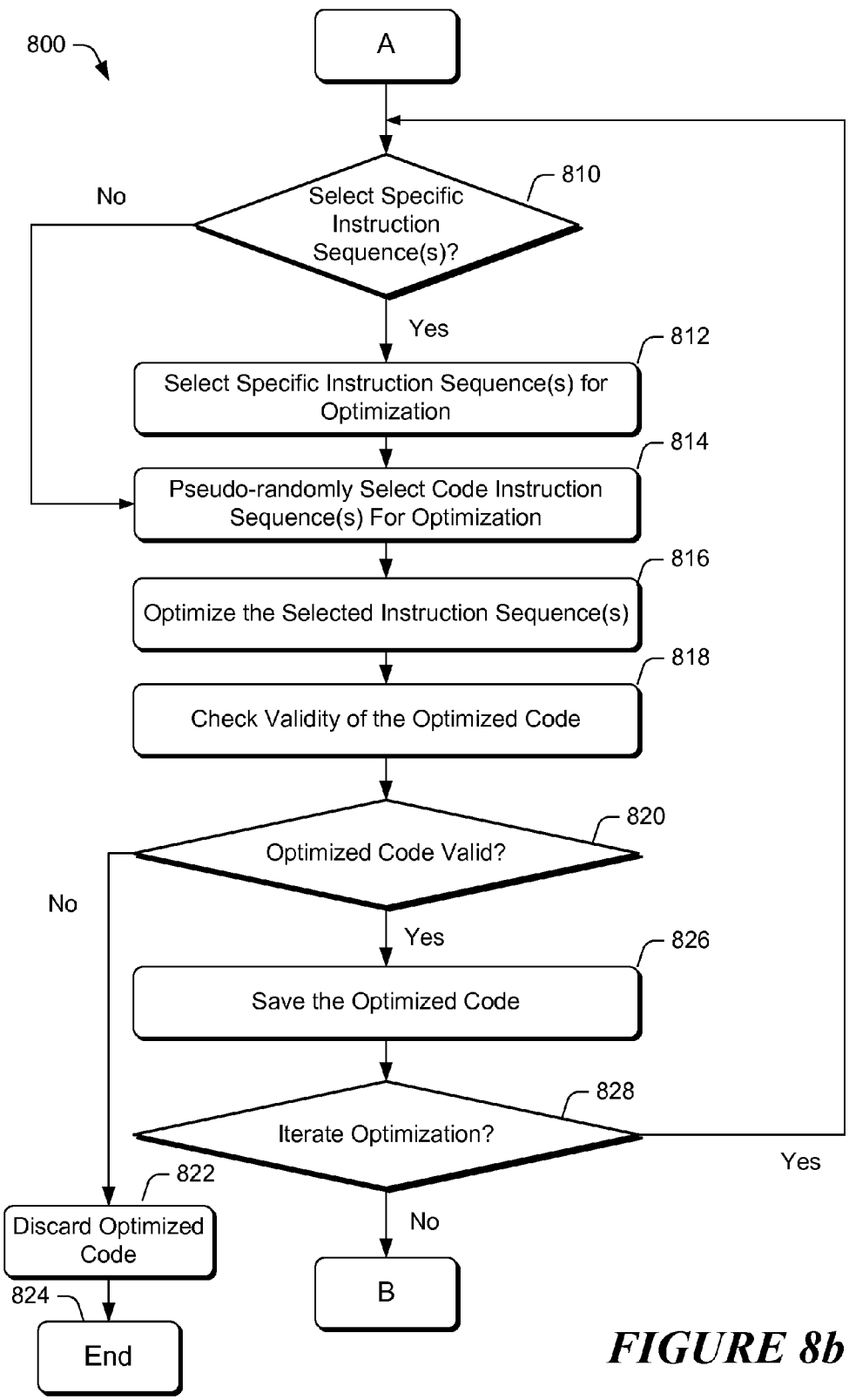
Figure 8C:
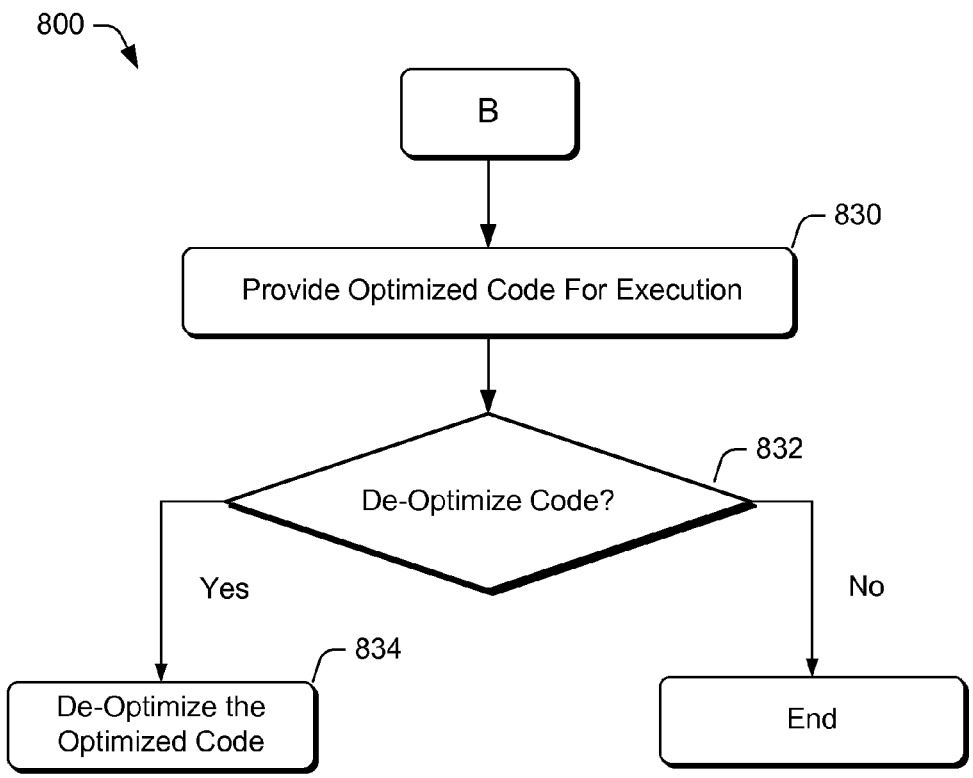

FIG. 8 illustrates a flow diagram of an exemplary process 800 for the transformation of a product code 108 and a checker code 110 into an obfuscated code 118 via pseudorandom peephole optimization. At block 802, the obfuscator 302 uses the code integration module 304 to integrate the product code 108 and checker code 110, producing integrated code 112. At decision block 804, a user may make a decision as to whether integrated code 112 should be provide with chaff code. If the user determines that chaff code should not be inserted into the integrated code 112, ("no" at decision block 804), the process may proceed to block 808.

However, if the user determines that chaff code should be inserted into integrated code 112, the obfuscator 302 may use the chaff code insertion module 304 to provide one or more chaff codes into the integrated code 112 at block 806. At block 808, the obfuscator 302 may save a copy of the integrated code 112 to at least one of the system memory 208 and one of the mass media storage devices, such as hard disk drive 218.

At decision block 810, the user may use the code selection module 322 to determine whether one or more specific instruction sequences of the integrated code 112 should be selected for obfuscation. For example, the user may select one or more instruction sequences of checker code portions 116 because of their importance, or the user may select certain instruction sequences of the software code 114 because they perform certain functions.

If the user determines that specific instruction sequences of the integrated code 112 should be selected, ("yes" at block 810), the user may use the code selection module 322 to select the instruction sequences for eventual optimization at block 812. However, if the user determines that no specific instruction sequences of the integrated code 112 should be select, ("no" at block 810), the process may proceed to block 814.

At block 814, the obfuscator 302 may use the peephole optimization module 320, in conjunction with the pseudorandom number generator module 314 and the cryptographic generator module 316, to pseudo-randomly select one or more instruction sequences of the integrated code 112. At block 816, the peephole optimization module 320 may perform peephole optimization on the one or more pseudo-randomly selected instruction sequences.

At block 818, the obfuscator 302 may activate the code checker module 324 to check the validity of the optimized code. At decision block 820, if the code checker module 324 determines that the optimized code is not functionally equivalent to the integrated code 112, ("no" at decision block 820), the optimized code is discarded at block 822 and the process may terminate at block 824. Nevertheless, in one embodiment of the process 800, the obfuscator 302 may subsequently initiate further executions of the process 600 starting at block 610 using the integrate code 112 saved at block 608.

However, if the code checker module 324 determines that the optimized code is functionally equivalent to the integrated code 112, ("yes" at decision block 820), the optimized code is saved to a mass storage device, such as a hard disk drive 118, a magnetic disk drive 120, or an optical disk drive, at block 826.

At decision block 828, the peephole optimization module 320 may determine if the process in blocks 810-822 and 826 should be iterated. For example, the obfuscator 302 may repeat the process if the user has configured to peephole optimization module 320 to go through a plurality of iterations. In such an implementation, if the peephole optimization module 324 determines that iteration should occur ("yes" at decision block 828), the process may loop back to block 810, where blocks 810-822 and 824 may be re-executed on the integrated code previously saved at block 808.

However, if the peephole optimization module 320 determines that iteration should not occur, ("no" at decision block 828), then the process will proceed to block 830. At block 830, the output module 326 may provide the optimized code, which is also known as the obfuscated code 118, for execution.

At decision block 832, a user may make a decision as to whether the optimized code should be de-optimized, that is, de-obfuscated. If the user determines that that code should be de-optimized ("yes" at block 832), the user may initiate an algorithm that may compute equivalent sequences that correspond to portions in the optimized code at block 834. The algorithm may further match the equivalent sequences to the portions in the optimized code to regenerate the original integrated code 112. Alternately, if it is determined at block 832 that de-optimization is not needed, process 800 may end.

Figure 6B:
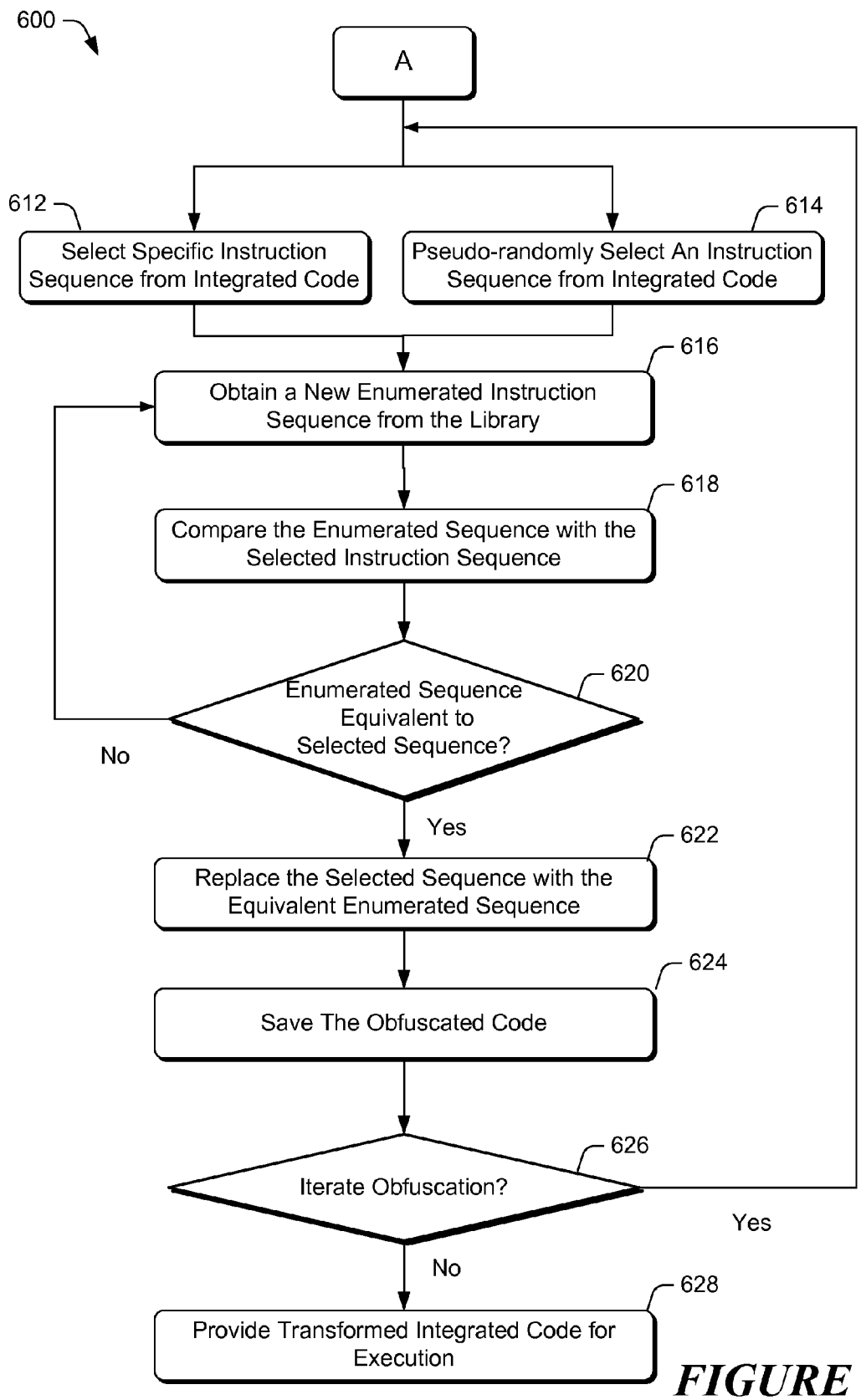
Figure 9:
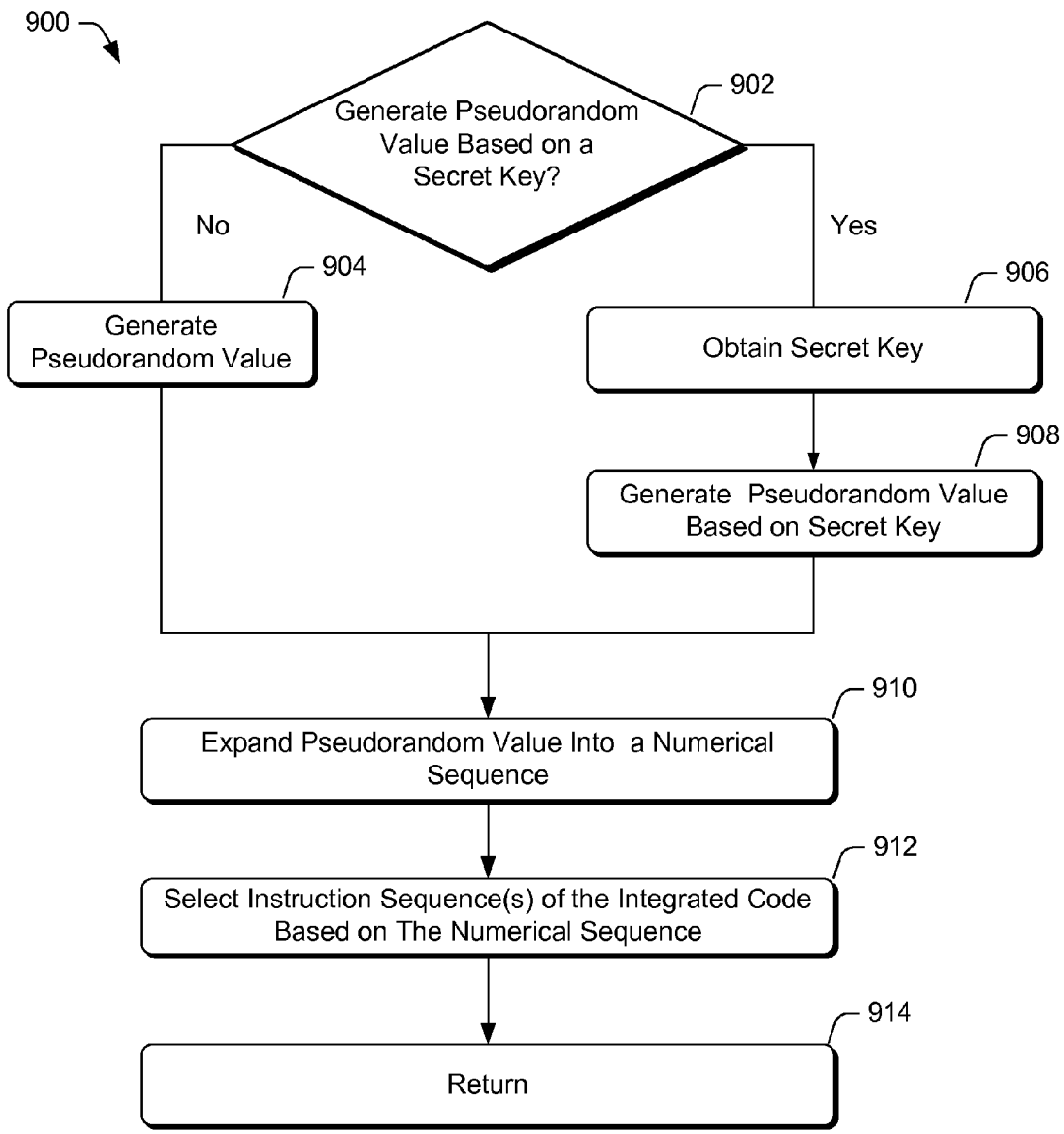
FIG. 9 is a flow diagram illustrating an exemplary process for the pseudorandom selection of instruction sequences of a software code for transformation.

FIG. 9 illustrates a flow diagram of an exemplary process 900 for the pseudorandom selection of instruction sequences of an integrated code 112 for transformation. Process 900 further illustrates block 614 of exemplary process 600, as shown in FIG. 6b, block 714 of exemplary process 700 shown in FIG. 7b, as well as block 814 of exemplary process 800 shown in FIG. 8b.

At block 902, the pseudorandom number generator module 314 may determine whether a pseudorandom number should be generated based on a secret key. In some embodiments, the pseudorandom number generator module 314 may make this determination based on a preference provided by a user via the hardware of keyboard/mouse interface 242 of the computing environment 200.

If the pseudorandom number generator 314 determines that a pseudorandom number should be generated without a secret key 304, ("no" at decision block 902), the pseudorandom number generator module 314 simply generates a pseudorandom number at block 904. However, if the pseudorandom number generator module 314 determines that a pseudorandom number should generated based on a secret key 304, then the pseudorandom number generator may command the input module 308 to obtain the secret key 304 at block 906. In some embodiments, the secret key may be retrieved from system memory 108 or a mass storage device if the secret key was previously created. In other embodiments, the pseudorandom generator may cause the computing system 200 to prompt the user to enter a secret key via hardware associated with the keyboard/mouse interface 242. At block 908, once the secret key is obtained, the pseudorandom number generator module 314 may use the secret key as a seed value to generate a pseudorandom number.

At block 910, the pseudorandom number generated by the pseudorandom number generator module 314 is passed on to a cryptographic generator module 316. In turn, the cryptographic number generator module 316 may expand the pseudorandom number into a numerical sequence. At block 912, the code substitution module 318 may use the numerical sequence to select one or more instruction sequences of the integrated code 112. At block 914, once the one or more instruction sequences of the integrated code 112 are selected, the process may return to block 616 and 716 of process 600 and process 700, respectively. Alternatively, in another embodiment, the process may return to block 816 of process 800.

Figure 10:
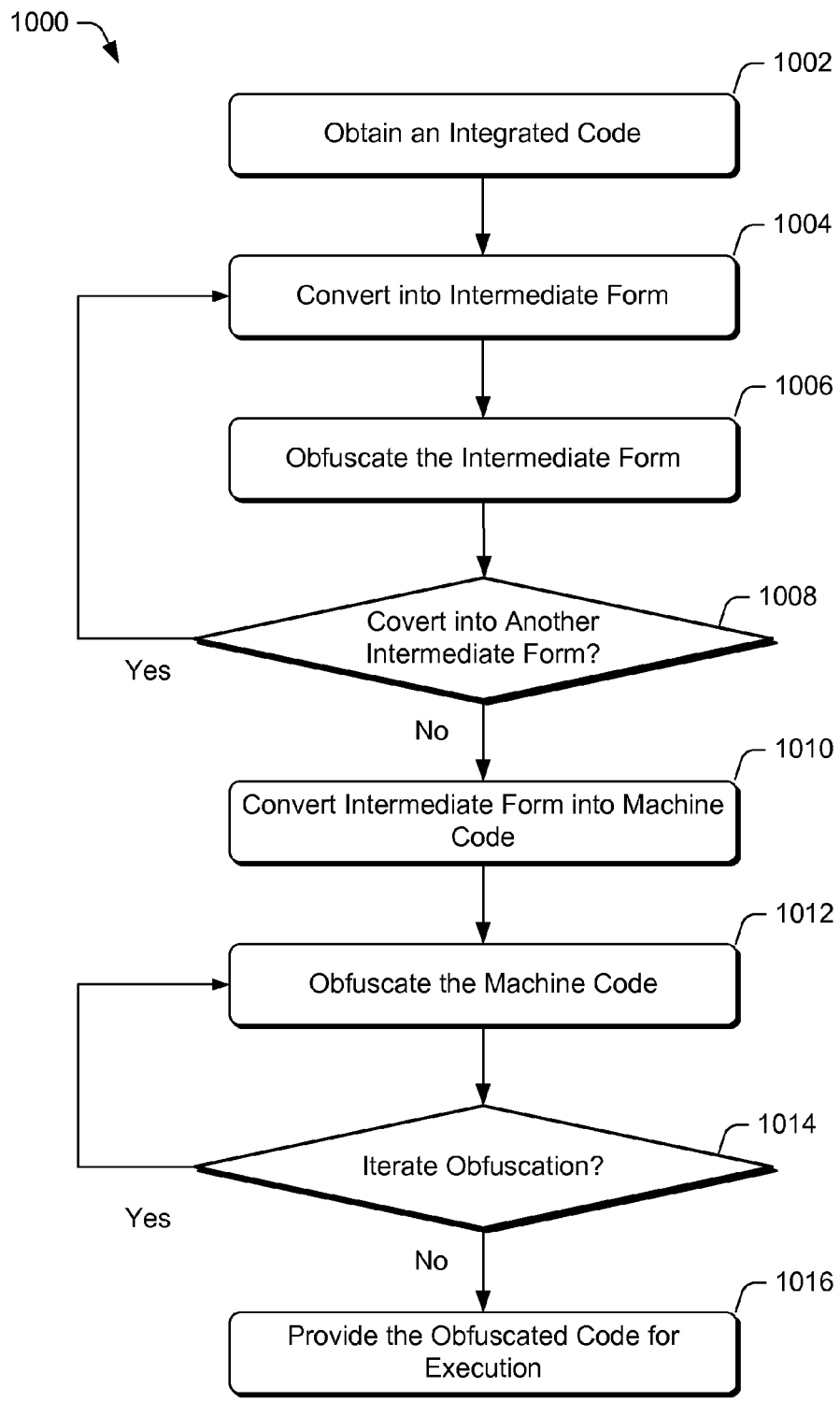
FIG. 10 is a flow diagram illustrating an exemplary process for multi-level iteration of software code obfuscation.

FIG. 10 illustrates a flow diagram of an exemplary process 1000 for multi-level iteration of software code obfuscation. At block 1002, an integrated code 112 is obtained. In one embodiment, the code integration module 310 and the chaff code insertion module 312 of the obfuscator 302 may provide the integrated code 112.

At block 1004, the integrated code 112 may be converted into an intermediate code, which may also be known as an LIR. In certain embodiments, LIRs may include bytecodes. In still other embodiments, the bytecodes may be based on custom built interpreters.

At block 1006, the LIR may be transformed. In some implementations, a code substitution module 318 may replace one or more portions of the LIR with equivalent instruction sequences from an enumerated library of instruction sequences. In other implementation, a peephole optimization module 320 may pseudo-randomly select instruction sequences of the LIR, and then perform optimization using techniques such as Boolean simplification. The code checker module 324 may be further used to check the functional equivalence of the new intermediate code to the integrated code 112. This process may be repeated until a functionally equivalent new intermediate code is found.

At decision block 1008, a user may determine whether the operations of block 1004-1006 should be repeated on the new intermediate code. If the user decides the operations should be repeated, ("yes" at decision block 1008), the process may loop back to block 1004 where the new intermediate code may be converted into another intermediate code for transformation. In some embodiments, this conversion may be carried out by building a new custom interpreter.

However, if the user determines that the operations should not be carried out on the new intermediate code, ("no" at decisions block 1008), the intermediate code may be converted into a machine code at block 1010. In some embodiments, the machine code may include the 80x86 code described above. At block 1012, the obfuscator 302 may be used to obfuscate the machine code. For example, in certain embodiments, the code substitution module 318 of the obfuscator 302 may pseudo-randomly select and transform one or more instruction sequences of the machine code into a new obfuscated code, such as obfuscated code 118, that is functionally equivalent to the original code. In other embodiments, the peephole optimization module 320 may pseudo-randomly transform one or more instruction sequences of the machine code into an optimized but functionally equivalent obfuscated code, such as obfuscated code 118.

At decision block 1014 the user may determine whether the newly obfuscated code should be further obfuscated. If the user determines that the newly obfuscated code should be further obfuscated, ("yes" at decision block 1013), the process loops back to block 1012 where further obfuscation may be performed. In one embodiment, the obfuscator 302 may be configured to automatically iterate the obfuscation for a desired number of cycles.

However, if the user determines that the newly obfuscated code, such as obfuscated code 118, should not be further obfuscated, ("no" at decision block 1014), the process may continue to block 1016, where the obfuscated code may be provided for execution.

Since the embodiments described with respect to FIGS. 6-10 may involve the pseudo-random selection of one or more portions of an integrated code 112, these embodiments may further advantageously enable the production of individualized obfuscated code. In other words, due to the pseudorandom selection process carried out by these embodiments, the embodiments may enable the production of different obfuscated codes 118 from the same integrated code 112. The production of individualized obfuscated code is an implementation of software individualization. This process may provide individually coded copies, such as individual copies of obfuscated product 106, from a single software product, such as original product 102. This may advantageously enable additional copies of a software product to be protected even when one individually coded copy is compromised. As a result, individualization may advantageously thwart attacks by hackers by necessitating extra effort to break each copy. Accordingly, individualized obfuscated code may reduce instances of software piracy.

Conclusion

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
generating at least one pseudorandom value;
selecting one or more instruction sequences from an instruction sequence library based on the at least one pseudorandom value;
inserting a chaff code that modifies a value using a first operation and reverses modification to the value using a second operation into a first integrated code; and
generating a second integrated code from the first integrated code by replacing each of the one or more instruction sequences in the first integrated code with an equivalent instruction sequence that is pseudo-randomly selected from the instruction sequence library so that each replacement obfuscates the first integrated code.

2. The method of claim 1, further comprising integrating a checker code and a product code to form the first integrated code.

3. The method of claim 1, further comprising:
executing the first integrated code to generate one or more first output states,
executing the second integrated code to generate one or more second output states; and
comparing each of the one or more first output states to a corresponding output state of the one or more second output states; and
saving the second integrated code if each of the one or more first output states matches a corresponding output state of the one or more second output states.

4. The method of claim 3, wherein executing the first integrated code includes executing one or more instruction sequences of the first integrated code using corresponding first input states, and wherein executing the second integrated code includes executing one or more instruction sequences of the second integrated code using corresponding second input states.

5. The method of claim 1, further comprising generating at least one additional pseudorandom value, and selecting an additional instruction sequence of the instruction sequence library based on the at least one additional pseudorandom value.

6. The method of claim 1, wherein the generating a pseudorandom value includes generating the pseudorandom value based on a predefined key.

7. The method of claim 1, further comprising inserting at least one chaff code into the second integrated code.

8. The method of claim 1, wherein the first integrated code includes at least one of a low-level intermediate representation (LIR) or a machine code.

9. The method of claim 8, wherein the LIR includes at least one of a custom bytecode or a Boolean clause.

10. A system for obfuscating software, comprising: a memory and processor;
an integration component that integrates a checker code and a product code to form a first integrated code;
an insertion component that inserts a chaff code into the first integrated code, the chaff code modifying a value using a first operation and reverses modification to the value using a second operation;

a number generation component that generates a plurality of pseudorandom value sequences;

a selection component that rearranges enumerated instruction sequences in an instruction sequence library based on the plurality of pseudorandom value sequences to produce a rearranged instruction sequence library; and a substitution component that transforms the first integrated code into a second integrated code by replacing each of one or more instruction sequences in the first integrated code with an equivalent enumerated instruction sequence from the rearranged instruction sequence library.

11. The system of claim 10, further comprising an optimization component that transforms the first integrated code into a third integrated code by optimizing one or more instruction sequences of the first integrated code.

12. The system of claim 10, further comprising an optimization component that transforms the second integrated code into a fourth integrated code by optimizing one or more instruction sequences of the second integrated code.

13. The system of claim 10, further comprising a validation component that validates functional equivalence of the second integrated code to the first integrated code.

14. The system of claim 10, further comprising a data store that stores the second integrated code that is functionally equivalent to the first integrated code.

15. The system of claim 10, wherein the number generation component further generates a pseudorandom value based on a pre-defined key.

16. A computer-readable storage memory comprising computer-executable instructions that, when executed, perform a method of software obfuscation comprising:

inserting a chaff code that modifies a value using a first operation and reverses modification to the value using a second operation into a first integrated code;

selecting instruction sequences of a first type from the first integrated code;

selecting instruction sequences of a second type from the first integrated code, in which a quantity of instruction sequences of the second type selected is a predetermined times greater than a quantity of instruction sequences of the first type selected;

generating a second integrated code from the first integrated code by replacing each instruction sequence selected from the first integrated code with an equivalent instruction sequence selected from an enumerated instruction sequence library so that each replacement obfuscates the first integrated code.

17. The computer-readable memory of claim 16, wherein the method further comprises:

executing the first integrated code to generate one or more first output states, executing the second integrated code to generate one or more second output states; and comparing each of the one or more first output states to a corresponding output state of the one or more second output states; and providing the second integrated code for execution if each of the one or more first output states matches the corresponding output state of the one or more second output states.

* * * * *